United States Patent

[11] 3,545,650

| | | |
|---|---|---|
| [72] | Inventor | Jimmy R. Williams<br>Minneapolis, Minnesota |
| [21] | Appl. No. | 771,968 |
| [22] | Filed | Oct. 30, 1968 |
| [45] | Patented | Dec. 8, 1970 |
| [73] | Assignee | Honeywell Inc.<br>Minneapolis, Minnesota<br>a corporation of Delaware |

[54] CAPACITIVE LIQUID QUANTITY INDICATING AND SHUT-OFF SYSTEM
3 Claims, 3 Drawing Figs.

| | | |
|---|---|---|
| [52] | U.S. Cl. | 222/56 |
| [51] | Int. Cl. | B67d 5/08 |
| [50] | Field of Search | 222/1, 55, 56 |

[56] References Cited
UNITED STATES PATENTS

| | | | |
|---|---|---|---|
| 3,162,326 | 12/1964 | Porter | 222/55 |
| 3,329,311 | 7/1967 | Goff et al. | 222/1 |

Primary Examiner—Samuel F. Coleman
Attorneys—Charles J. Ungemach, Ronald T. Reiling and James A. Phillips ABSTRACT: A capacitive fuel quantity indicating and shutoff system wherein a signal from a compensator capacitor in the system is used in computing the fuel density which is then multiplied by a factor corresponding to a predetermined volume. The product of density and the predetermined volume is compared to the actual mass of fuel which is indicated by the system, and a refueling valve is shut off when the actual mass exceeds the product of density and the predetermined volume.

PATENTED DEC 8 1970　　　　　　　　　　　　　　　　3,545,650

INVENTOR.
JIMMY R. WILLIAMS
BY Charles J. Ungemach
ATTORNEY

3,545,650

CAPACITIVE LIQUID QUANTITY INDICATING AND SHUT-OFF SYSTEM

SUMMARY

A fluid mass-indicating system is modified to provide a signal to a filling means when a predetermined volume is reached. The indicating system before modification includes an indicator which provides a signal indicative of the mass of fluid in the system and has a compensator element which is immersed in the fluid. After modification a signal corresponding to the density of the fluid is derived from the compensator element and multiplied by a factor corresponding to a predetermined volume. The signal that is the product of density and volume is compared with the signal indicative of mass developed by the system and when the two signals are equal a filling means is closed, preventing further filling.

DETAILED DESCRIPTION

Figure 1:
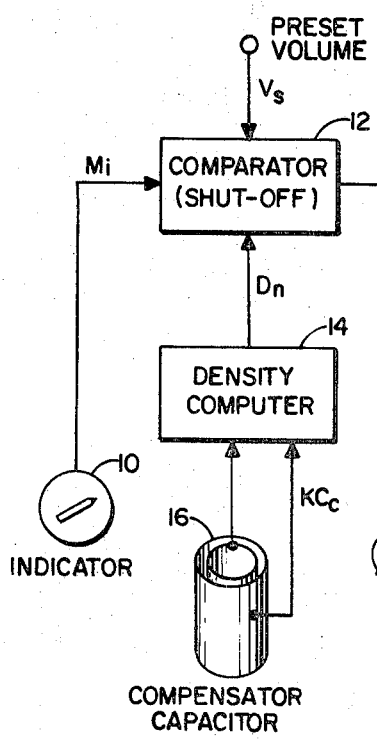
FIG. 1 is a block diagram of the fluid mass-indicating and shutoff system.
Figure 2:
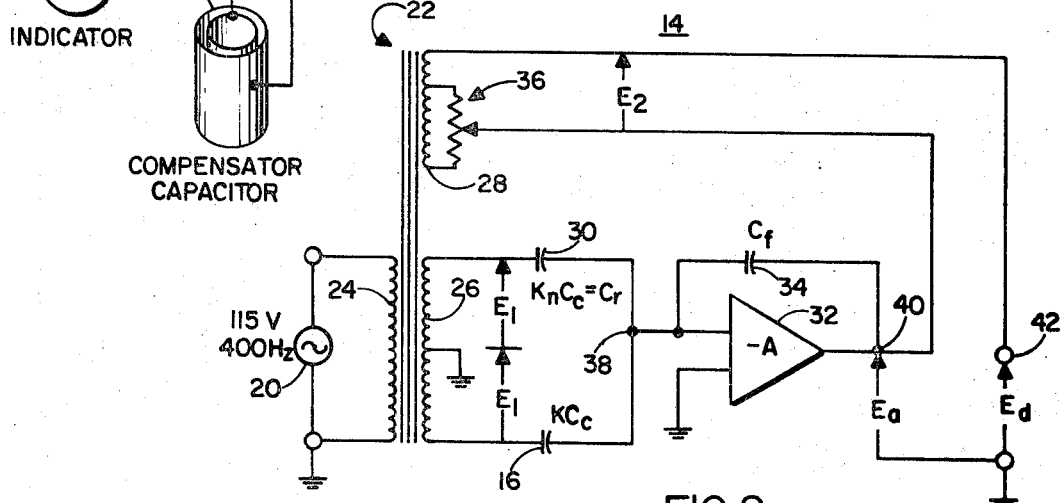
FIG. 2 is a schematic diagram of a density computer.
Figure 3:
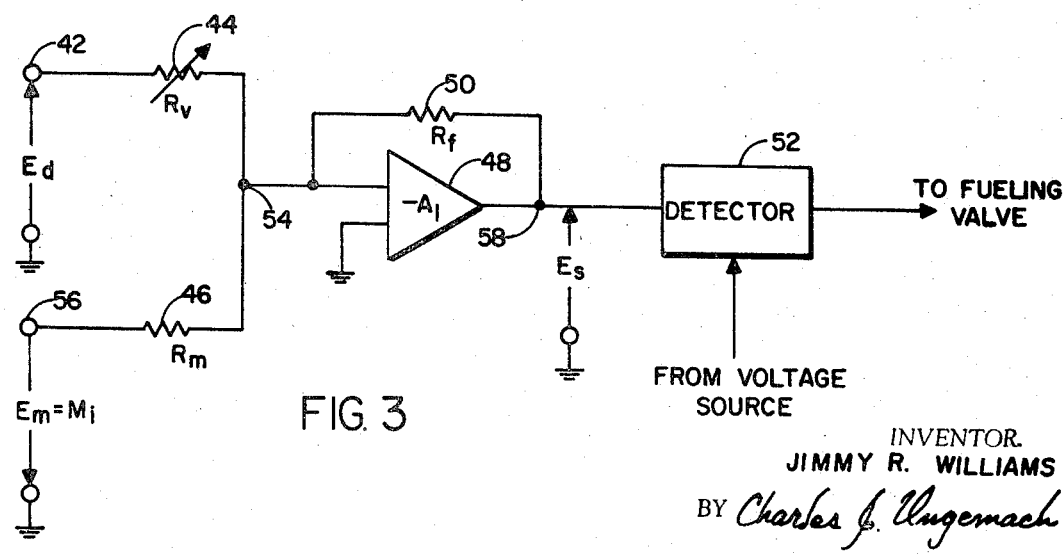
FIG. 3 is a schematic diagram of a comparator.

The invention is illustrated in FIGS. 1, 2, and 3. A block diagram of the fuel quantity indicating and shutoff system is shown in FIG. 1. Although the invention is described in terms of a fuel quantity system its use is not limited thereto. It can be used with any fluid, not only a fuel. The block diagram of FIG. 1 includes an indicator 10, a comparator 12, a density computer 14, a compensator capacitor 16, and a fueling valve 18. Indicator 10 provides a signal corresponding to the mass of fuel in a fuel tank (which is not shown). This signal is called the indicated fuel mass or indicated mass and is designated $m_i$. This signal is applied to one input of comparator 12.

Capacitor 16 is completely immersed in the fuel and has a total wetted capacitance $KC_c$, where K is the dielectric constant of the fuel and $C_c$ is the dry capacitance of capacitor 16. The capacitance $KC_c$ is used in computer 14 which computes the nominal density $D_n$ of the fuel. Computer 14 develops a signal corresponding to $D_n$ which is applied to a second input of comparator 12.

Applied to a third input of comparator 12 is a third signal corresponding to a preset or preselected volume designated $V_s$. Thus three signals are applied to comparator 12, $M_i$, $D_n$, and $V_s$. Comparator 12 forms the product $V_sD_n$ and compares it with $M_i$. When $M_i$ equals or exceeds the product $V_sD_n$, comparator 12 generates a signal which is applied to refueling valve 18, shutting it off.

The nominal density $D_n$ is derived from the familiar basic equation for a compensated capacitance gage, $$\frac{(K-1)}{D_n} = B + A(K-1) \tag{1}$$

where K is the dielectric constant of the fuel and A and B are constants. When equation (1) is solved for $D_n$ the following equation results:

$$D_n = \frac{K-1}{B + A(K-1)} \tag{2}$$

$D_n$ is defined as the density of a fuel which conforms exactly to this equation. In an indicator designed for use on a gage which operates in accordance with equation (1) it can be shown that $$M_i = V_a D_n \tag{3}$$

where $V_a$ is the actual volume of fuel in the tank. Therefore, at shutoff $$V_a D_n = V_s D_n \tag{4}$$

Dividing this equation by $D_n$, the result is:

$$V_a = V_s \tag{5}$$

therefore fueling valve 18 is shutoff when the actual fuel volume $V_a$ equals the preset volume $V_s$, independent of fuel density $D_n$. This independence of course is very desirable.

Computer 14 develops a signal corresponding to $D_n$. For restricted values of K the fuel density $D_n$ is quite closely approximated by an equation of the form $$D_n = J + H(K - K_n) \tag{6}$$

where J and H are constants. K is the dielectric constant of the fuel, and $K_n$ is the dielectric constant of a nominal fuel at 0° C. $K_n$ is about 2.133 for a typical fuel. From equation (6) it is seen that $D_n$ is equal to J if K is set equal to $K_n$. $D_n$ and hence J can be evaluated by setting $K = K_n = 2.133$ in equation (2) and solving it for $D_n$. From equation (6) it is also seen that the derivative thereof with respect to K is equal to H. Therefore H can be determined by differentiating equation (2) and evaluating the resulting equation when K is set equal to $K_n$ which is equal to 2.133. When K is restricted to the range 2.05—2.22, equation (6) has a value which differs by a maximum of 0.11 percent from the value of equation (2) over the same range. Thus equation (6) is a good approximation of equation (2).

Equation (6) is implemented by density computer 14. FIG. 2 is a schematic diagram of an electronic density computer. Computer 14 includes a source of AC voltage 20, a transformer 22 having a primary winding 24 and secondary windings 26 and 28, a fixed capacitor 30, the compensation capacitor 16, an amplifier 32, a feedback capacitor 34, and a potentiometer 36.

Source 20 is connected across primary winding 24 of transformer 22 and the bottom lead of the winding is connected to a circuit reference point (ground). Secondary winding 26 is tapped and the tap is connected to ground. The voltage developed across each half of secondary winding 26 is designated $E_1$ and they are 180 electrical degrees out of phase. Capacitor 30 is connected between one of the ends of secondary winding 26 and a summing point 38. Capacitor 16 is connected between the other end of winding 26 and the summing point 38.

Amplifier 32 has two input terminals and an output terminal 40. One of the input terminals is connected directly to summing point 38 and the other is connected to ground. Feedback capacitor 34, having a capacitance $C_f$, is connected between amplifier output terminal 40 and summing point 38. Amplifier 32 has a very high gain, $-A$. The negative sign indicates that the output signal of the amplifier is 180° out of phase with its input signal. The output voltage of the amplifier is designated $E_a$. Capacitor 30 has a fixed capacitance $C_r$, selected such that $C_r$ equals $K_nC_c$, where $C_c$ is the dry capacitance of compensator capacitor 16. Assuming the current flowing into the input terminal of amplifier 32 is negligible (because of the high input impedance of amplifier 32) the sum of the currents going into summing point 38 is $$E_aC_f + E_1C_cK_n - E_1C_cK = 0 \tag{7}$$

and solving equation (7) for $E_a$, $$E_a = \frac{E_1C_c(K - K_n)}{C_f} \tag{8}$$

The resistance element of potentiometer 36 is connected between one end and an intermediate tap of secondary winding 28 of transformer 22. The other end of the secondary winding is connected to an output terminal 42. The voltage between ground and terminal 42 is designated $E_d$. The wiper of potentiometer 36 is connected to output terminal 40 of amplifier 32. The voltage between the wiper and terminal 42 is designated $E_2$.

From the schematic it is apparent that $$-E_a - E_2 + E_d = 0 \tag{9}$$

or transposing $$E_d = E_2 + E_a \tag{10}$$

Substituting for $E_a$, $$E_d = E_2 + \frac{E_1C_c(K - K_n)}{C_f} \tag{11}$$

In this equation $E_2$, $E_1$, $C_c$, $K_n$, and $C_f$ are known constants. If $E_2$ is set numerically equal to J, and $E_1C_cC_f$ is set numerically equal to H, then $$E_d = J + H(K - K_n) \quad (12)$$

$E_d$ corresponds to $D_n$, i.e., $E_d$ is an analog of $D_n$. It is in this sense that the density $D_n$ is computed.

It should be noted that the voltages developed across the two portions of secondary winding 26 need not be of equal magnitude, although they must be 180° out of phase. For example the magnitude of the voltage applied to capacitor 30 may be $E_3 = E_1$. In this case capacitor 30 must be scaled so that $$C_r = \frac{E_1 K_n C_c}{E_3}$$

instead of $K_n C_c$. Otherwise the operation of the system is the same.

FIG. 3 is a diagram of comparator 12. Comparator 12 includes a variable resistor 44 having a resistance $R_v$, a fixed resistor 46 having a resistance $R_m$, an amplifier 48, a feedback resistor 50 having a resistance $R_f$, and a detector 52.

Resistor 44 is connected between output terminal 42 of computer 14 and current summing point 54. Resistor 46 is connected between a terminal 56 and summing point 54. The voltage $E_d$ present at terminal 42 corresponds to $D_n$. The voltage $E_m$ present at terminal 56 corresponds to $M_i$ and is developed by indicator 10. Voltages $E_d$ and $E_m$ are, for example, 400 cycle and are 180° out of phase with each other. Amplifier 48 has two input terminals and an output terminal 58. One of the input terminals is connected directly to summing point 54 and the other is connected to ground. Feedback resistor 50 is connected between the output terminal of amplifier 48 and summing point 54. A voltage $E_s$ is developed at the output terminal of amplifier 48 and this voltage is either positive or negative in that it is in phase or 180° out of phase with the source voltage 20 (shown in FIG. 2) depending upon the relative magnitudes of $E_d$, $E_m$, and the resistance $R_v$.

Assuming that the gain of amplifier 48, $-A_1$, is very high and that the amplifier draws negligible input current, the sum of the currents at summing point 54 is, $$\frac{E_d}{R_v} - \frac{E_m}{R_m} + E_s R_f = 0 \quad (13)$$

When $E_s$ equals zero, and assuming $\frac{E_d}{E_m} = \frac{D_n}{M_i}$ $$\frac{E_d}{E_m} = \frac{D_n}{M_i} = \frac{R_v}{R_m} \quad (14)$$

$R_m$ is fixed but $R_v$ can be varied and if it is set such that the ratio $\frac{R_v}{R_m}$ is numerically equal to the reciprocal of $V_s$, the preset volume, $\frac{D_n}{M_i} = \frac{R_v}{R_m} = \frac{1}{V_s}$ and $D_n V_s = M_i = D_n V_a$.

Therefor $V_a$ equals $V_s$ when $E_s$ equals zero. Therefor to obtain a signal for shutting off valve 18 it is only necessary to detect when $E_s$ changes phase. This is the function of detector 52 which is connected between the output terminal of amplifier 48 and fueling valve 18. Detectors such as detector 52 are well known to those skilled in the art. For the circuit as it is shown shutoff occurs when $E_s$ becomes positive, that is when it is in phase with source voltage 20, as $M_i$ is increasing. Note also that $E_d$ and $E_m$ may be scaled such that $\frac{E_d}{E_m} = (\text{constant}) \frac{D_n}{M_i}$.

Operation is the same except for a proportionality factor between $V_a$ and $V_s$.

It is to be understood that the above-described arrangements are merely illustrative of the application of the principles of the invention. Other arrangements may be devised by those skilled in the art without departing from the spirit and scope of the invention.

I claim:

1. A liquid quantity indicating and shutoff system, comprising:
    means for developing a first signal indicative of the mass, $M_i$, of liquid associated with the system;
    means for developing a second signal indicative of the density, $D_n$, of the liquid associated with the system;
    means for developing a third signal corresponding to a predetermined volume, $V_s$;
    means for developing a fourth signal corresponding to the product $V_s ** D_n$, comparing it with the first signal and developing a fifth signal when the first signal is at least as great as the fourth signal; and
    means for shutting off a flow of liquid into the system when the fifth signal is developed.

2. The system of claim 1 wherein the means for developing the second signal comprises:
    a first source of alternating voltage $E_1$;
    a second source of alternating voltage $E_3$ of opposite phase;
    an electronic amplifier having input and output terminals;
    a compensator capacitor in series with the second source and connected to the input terminal of the amplifier, the compensator capacitor mounted in the system so that its plates are covered by the liquid in the system even if there is only a nominal amount of liquid present, the capacitance of the capacitor being $KC_c$ where K is the dielectric constant of the liquid and $C_c$ is the dry capacitance of the capacitor;
    a fixed capacitor in series with the second source and also connected to the input terminal of the amplifier, the capacitance of the fixed capacitor being $\frac{K_n C_c E_1}{E_3}$
    where $K_n$ is the nominal dielectric constant of the liquid at a predetermined temperature;
    a third capacitor of capacitance $C_f$ connected between the input and output terminals of the amplifier;
    output means; and
    a variable source of voltage, $E_2$, connected between the output terminal of the amplifier and the output means, so that the voltage at one output means has the form $$\frac{E_2 + E_1 C_c (K - K_n)}{C_f}$$

3. The system of claim 1 wherein the means for developing a fourth signal corresponding to the product $V_s ** D_n$ and comparing it with the first signal, $M_i$, and developing a fifth signal when the first signal is at least as great as the fourth, comprises:
    an amplifier having input and output terminals;
    a first resistor of fixed resistance $R_m$ in series with the first signal and connected to the input terminal of the amplifier;
    a second resistor of variable resistance $R_v$ in series with the second signal and also connected to the input terminal of the amplifier;
    the first and second signals being 180° out of phase and the ratio $R_v/R_m$ set equal to $V_s$;
    a third resistor of resistance $R_f$ connected between the output and input terminals of the amplifier; and
    means for detecting when the voltage at the output terminal of the amplifier reaches a predetermined level.